Patented Feb. 10, 1925.

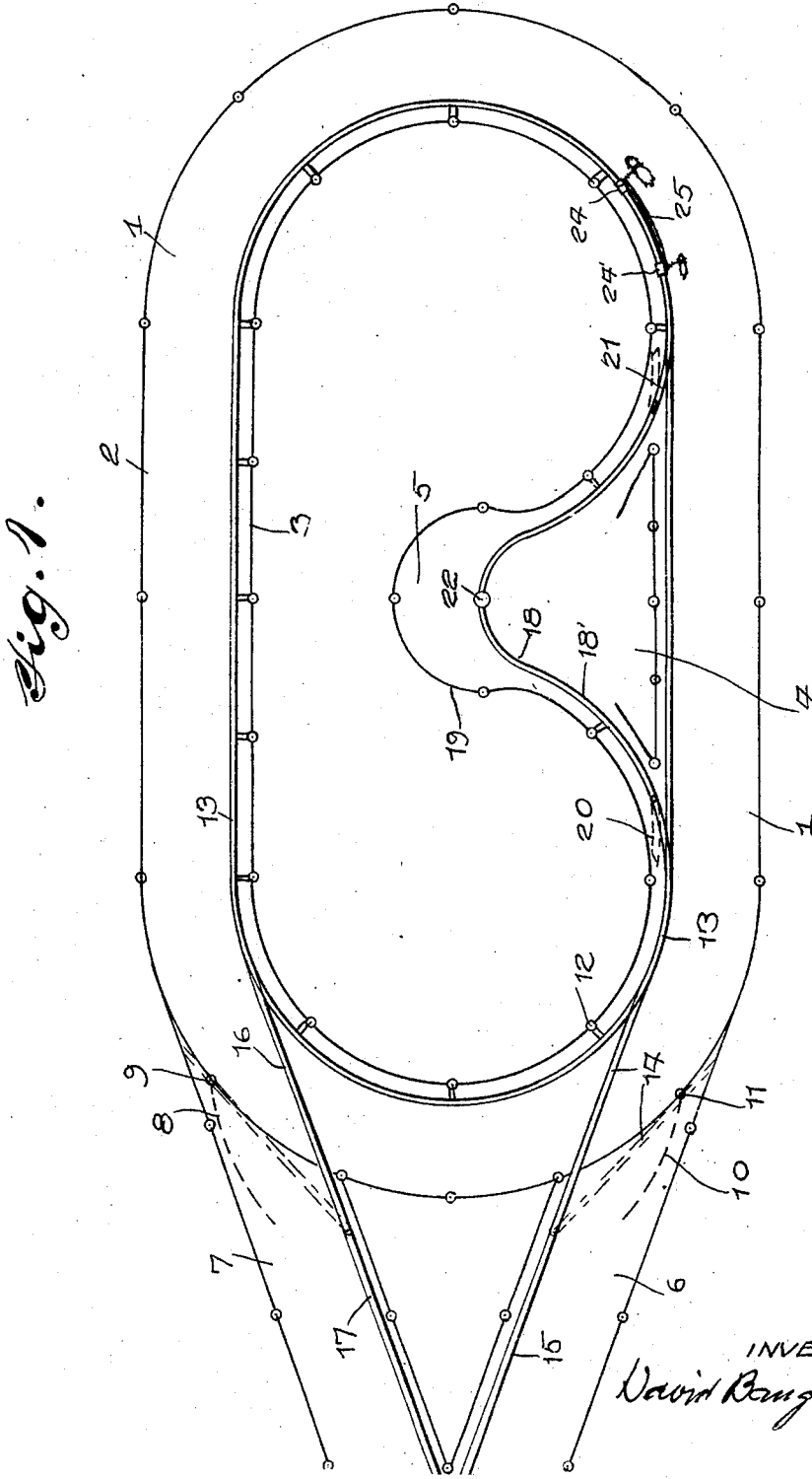

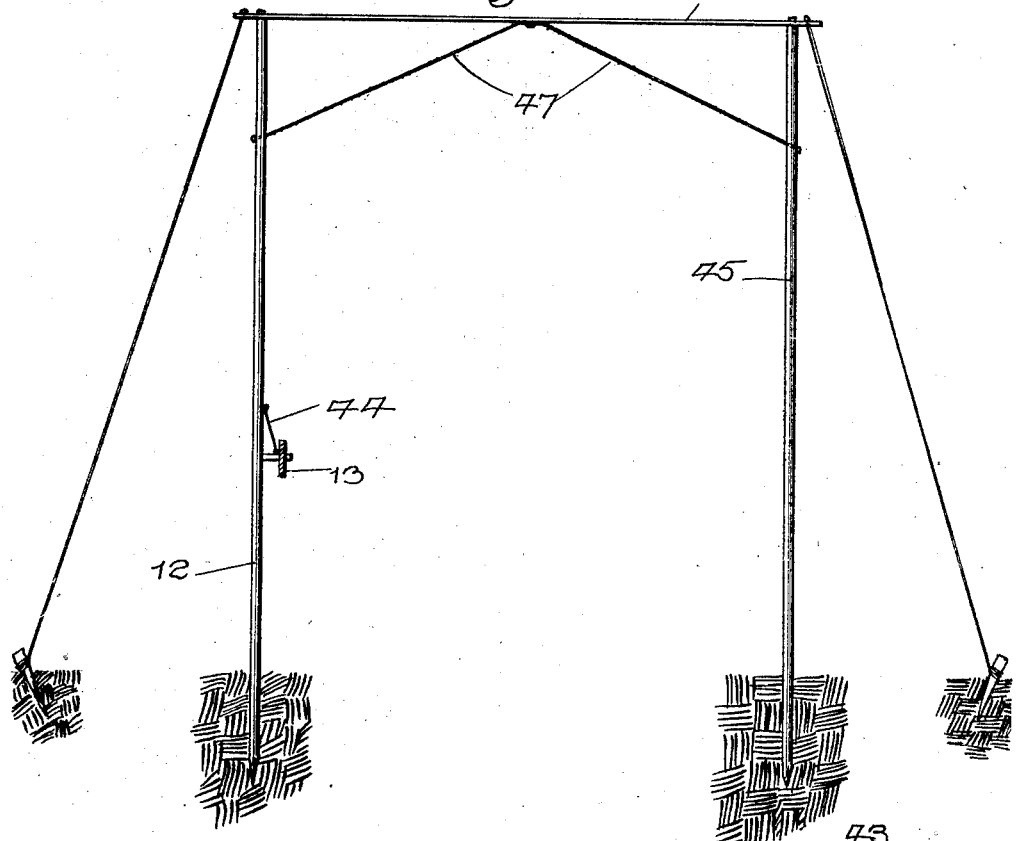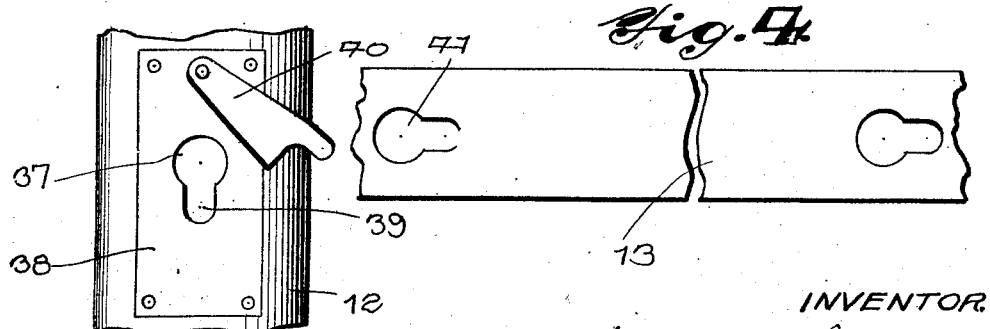

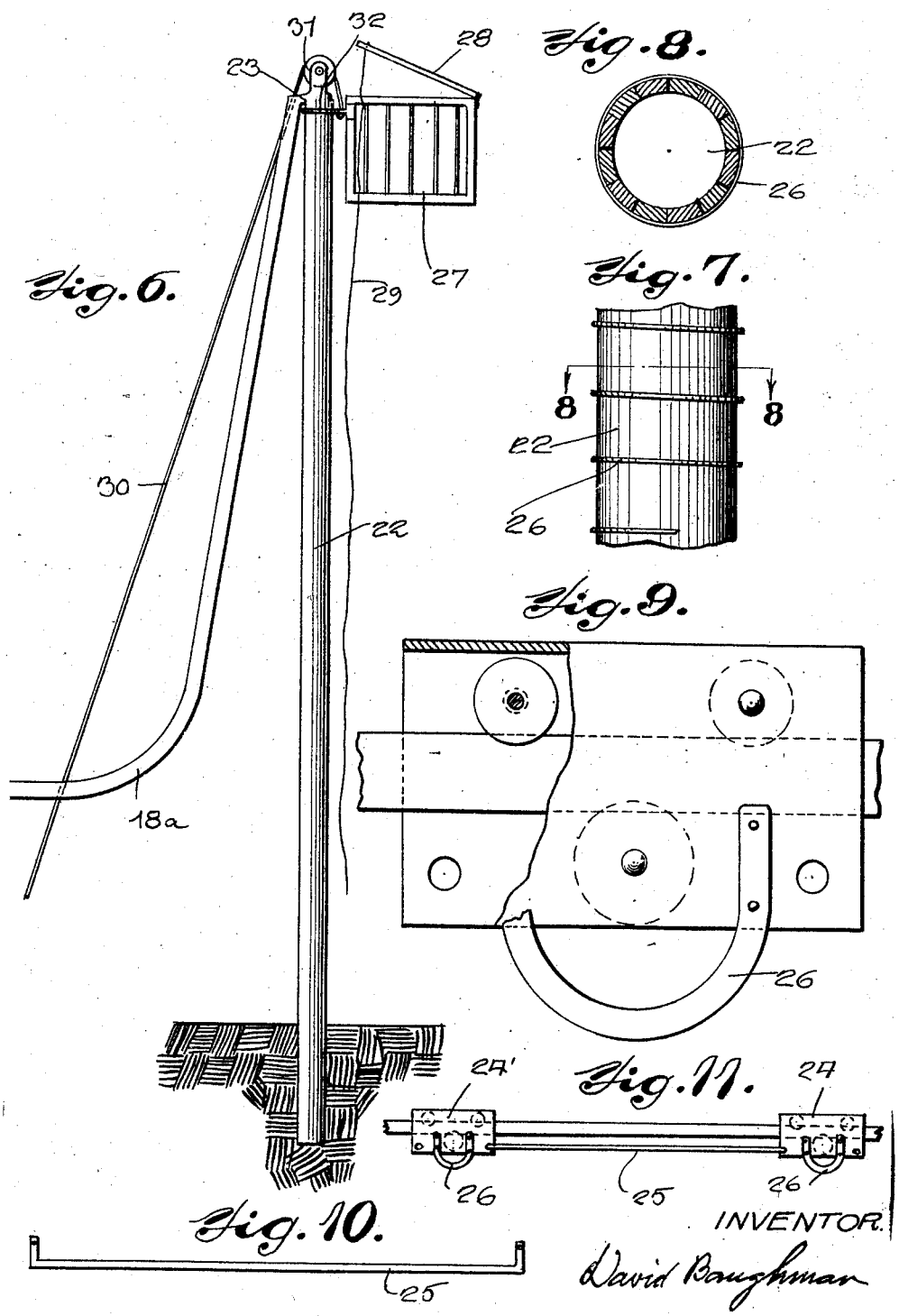

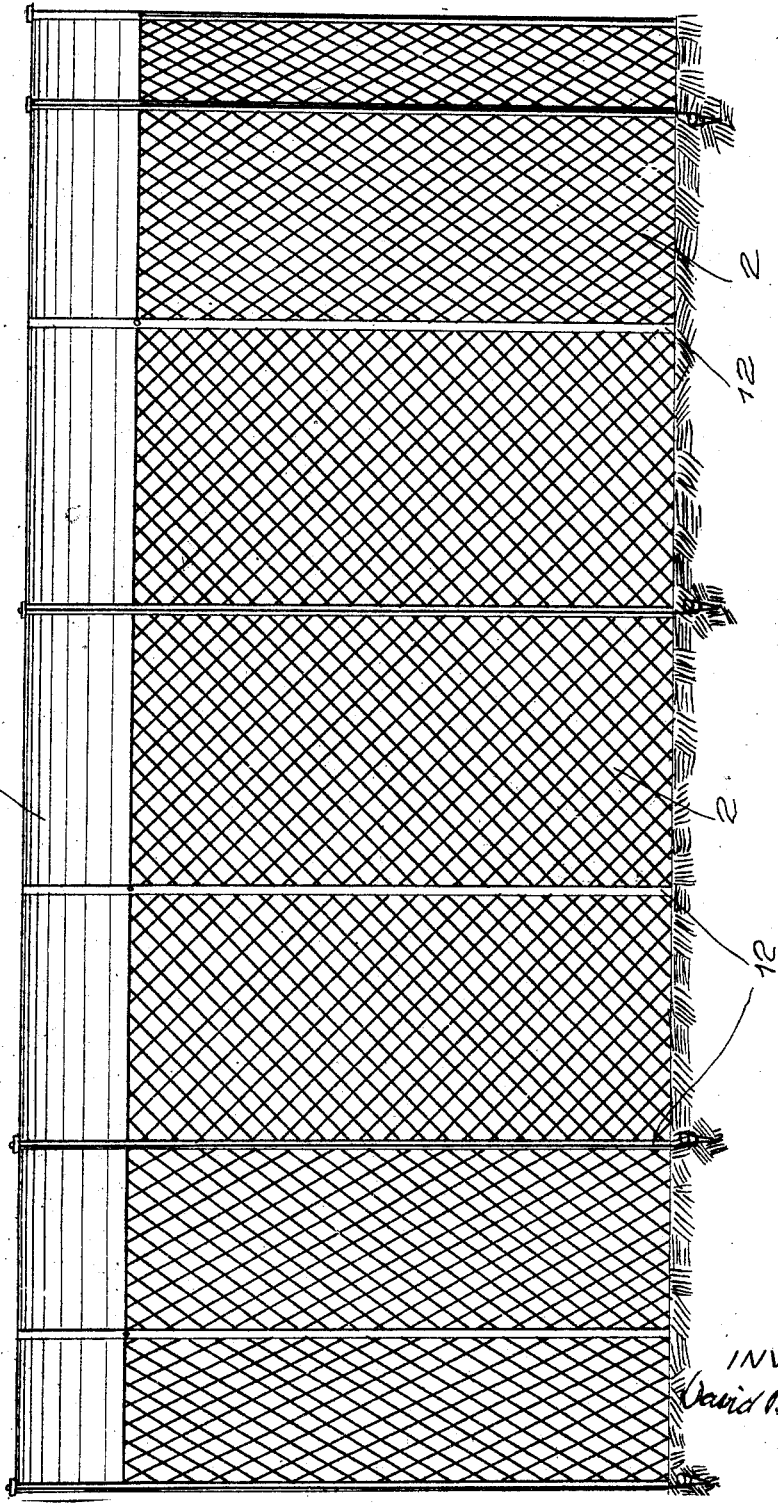

1,525,713

UNITED STATES PATENT OFFICE.

DAVID BAUGHMAN, OF SAFETY HARBOR, FLORIDA.

DEVICE FOR EXHIBITING WILD ANIMALS.

Application filed December 5, 1922. Serial No. 604,991.

*To all whom it may concern:*

Be it known that I, DAVID BAUGHMAN, a citizen of the United States, residing at Safety Harbor, in the county of Pinellas and State of Florida, have invented certain new and useful Improvements in a Device for Exhibiting Wild Animals, of which the following is a specification.

This invention relates to improvements in a device for the exhibition of wild animals and has for its object to provide an oblong or circular or other shaped runway or course over which the animals may be driven.

Another object of the invention is to provide a runway for the exhibition of wild animals and means whereby the animals may be kept to the course and means whereby the animals may be caused to travel over the course one or a number of times.

A further object of the invention is to provide means for exhibiting wild animals including a pole up which the animals may be made to climb and means whereby the animals may be let down from the top of the pole.

A still further object of the invention is to provide in a runway for animals, a track with carriages thereon, to which the animals may be chained and coupling means for connecting a plurality of said carriages.

With the above and other objects in view I have invented the device illustrated in the accompanying drawings, in which:

Figure 1, is a plan view of my device;

Figure 2, is a section on line 2—2, Figure 1;

Figure 3, is an enlarged plan view of a bracket pole;

Figure 4, is a detail view of a section of track;

Figure 5, is an elevational view of a section of a pole showing a bracket lock;

Figure 6, is a detail, elevational view of a pole and cage used in connection with my device.

Figure 7, is an enlarged plan view of a section of modified form of pole;

Figure 8, is a section on line 8—8 thereof;

Figure 9, is an enlarged detail, elevational view partly in section of a carriage;

Figure 10, is a detail plan view of a carriage coupling;

Figure 11, is an elevational view of a carriage shown connected and mounted upon the track; and Figure 12, is a side elevational view of a portion of my runway.

Like reference characters indicate like parts throughout the following specification and in the several views in the drawings, in which 1 indicates an oblong runway or course for the exhibition of wild animals, said course enclosed within an outer fencing 2, and inner fencing 3. Said fencing may be made either of heavy netting or iron poles as desired. The inner fencing 3, at the side 4, turns inwardly around the central portion 5, of the exhibition enclosure, the purpose of which will presently be explained. An entrance 6, extending from any other building, or other animal enclosure, leads to the course 1, and another similar course or outlet course 7, is provided which also connects with the course 1. A gate 8, mounted upon the post 9, is adapted to close the egress course 7, whereby the animals could be caused to continue on the course 1. A gate 10, is mounted upon the post 11, for closing the outlet course 6, to said course 1. Upon the inner line of fence posts 12, upon which the fence 3, is mounted, is a trackway 13, which follows the course of the fence 3. A switch 14, leading from the entrance course track 15, connects said latter track with the track 13. A similar switch 16, connected to the outlet course track 17, is adapted to connect the track 13 with the said track 17. A track 18, following the inwardly turned portion 19, of the fence 3, is provided with switches 20 and 21 connecting with the main track 13. The side 18' of the track 18 leads to a high pole 22, and turns upwardly and extends to and is fastened at 23 to the top of said pole, the object of which will be presently explained. Operating on track 13 are a plurality of carriages 24, which may be connected together by coupling rods 25.

In exhibiting wild animals over this course, I prefer to chain an animal to the loop 26 of the carriage 24, and couple said carriage by the rod 25, to the carriage 24' and chain to the carriage 24' a dog, the rod 25 being sufficiently long to prevent the dog from reaching the heels of the animal in front. However, by chaining a dog in a position directly behind the animal the former, in its efforts to get away from the dog, will walk or run in advance of the latter around the course run and will continue to do so as long as it is on the course. It is to be understood, of course, that if desired, a number of animals may be caused to move over the course at the same time.

For the purpose of better exhibiting animals such as bears, mountain lions and other tree-climbing animals, I have provided the pole 22, referred to above. These animals are switched onto the track 18' and at the point 18ª of said track 18, where it turns upwardly, the dog is unleashed from its carriage, following the animal. The animal, still chained to its carriage, will be enabled to climb the pole 22 easily through the means of a series of rings 26, bound around said pole at suitable intervals. At the top of this pole is a cage 27, into which the animal will go when the top of the pole is reached. This cage is provided with a door 28, which may then be closed through the means of a cord or cable 29, connected thereto after which the cage may be let down to the ground through the releasing of the cable 30, operating over the pulley 31, on the top of the pole which cable is connected to the collar 32 on the pole 22, to which the cage 27, is connected.

The pole 22, may be in the form of a sectional column as indicated in Figure 8. The track 13, is mounted upon the poles 12, by means of brackets 33, having heads 34 and 35, on its ends and reduced necks 36, connecting said heads to the pole. The head 35, is adapted to be inserted in slots 37, in the plates 38, on the poles 12 and slipped behind the reduced portions 39, of said slots 37. A key is afforded to the plates 38, for locking the brackets 33 to said poles 12. The track 13, is provided with slots 41, similar to the slots 37, to receive the other ends of the said brackets 33. The outer ends 42 of said brackets are provided with eye-bolts 43, for engagement with the brace hooks 44, vertically mounted on poles 12. Seats or benches may be provided on one or both sides or around three sides of the animal exhibiting course. It is thought unnecessary to illustrate the same here. It is to be understood that this course may either be set up in a building, tent or in the open, as desired. It is also to be understood that this arrangement may be used at county fairs and stock shows for the purpose of exhibiting thorough-bred stock. The top 47, connects the outer and inner fences 2 and 3, of the runway and may be formed either of canvas as shown or netting.

Having described my invention that which I claim to be new and desire to procure by Letters Patent is:

1. An animal exhibiting device embracing a course and means whereby chained animals may travel over said course, said means including a track extending around said course for carriages on said track to which the animals may be chained, spacing means for coupling a plurality of said carriages whereby animals may be held suitably spaced apart.

2. An animal exhibiting device embracing a course and means whereby chained animals may travel over said course, said means including a track extending around said course and carriages on said track to which the animals may be chained spacing means for coupling a plurality of said carriages whereby animals may be suitably spaced apart, pole mounted in the center of said course, additional tracks connecting with said main track and extending to said pole and switches connecting said main and other tracks whereby climbing animals may be diverted from said main track to said pole.

3. An animal exhibiting device embracing a course and means whereby chained animals may travel over said course, said means including a track extending around said course and carriages on said track to which the animals may be chained, spacing means for coupling a plurality of said carriages whereby animals may be suitably spaced apart, pole mounted in the center of said course, additional tracks connecting with said main track and extending to said pole and switches connecting said main and other tracks whereby climbing animals may be diverted from said main track to said pole, and a cage mounted to be raised or lowered on said pole whereby said climbing animals may be removed from the top of the pole.

4. An animal exhibiting device embracing a course and means whereby chained animals may travel over said course, said means including a track extending around said course and carriages on said track to which animals may be chained, spacing means for coupling a plurality of said carriages whereby animals may be held suitably spaced apart, a pole mounted in the center of said course, additional tracks connected with said main tracks and extending to and up said pole, and switches connecting said main and other tracks whereby climbing animals may be diverted from said main track to said pole.

In testimony whereof I affix my signature in the presence of two witnesses.

DAVID BAUGHMAN.

Witnesses:
ROBT. L. SHARP,
H. E. CORRIGAN.